United States Patent
Chinnakannan et al.

(10) Patent No.: US 11,861,356 B1
(45) Date of Patent: Jan. 2, 2024

(54) CONTINUOUS DEPLOYMENT AND ORCHESTRATION OF FEATURE PROCESSING UNITS IN A MANAGED CLOUD AND A PROVIDER NETWORK FOR CONSISTENT DATA PROCESSING

(71) Applicant: Amazon Technologies, Inc., Seattle, WA (US)

(72) Inventors: Palani Chinnakannan, San Jose, CA (US); Nicolas Pouyez, Bainbridge Island, WA (US); Venkata Harish Kommaraju, Redmond, WA (US); Lomash Kumar, Sammamish, WA (US); Christopher Michael Morrissey, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 77 days.

(21) Appl. No.: 17/710,741

(22) Filed: Mar. 31, 2022

(51) Int. Cl.
*G06F 9/44* (2018.01)
*G06F 8/65* (2018.01)

(52) U.S. Cl.
CPC ..................... *G06F 8/65* (2013.01)

(58) Field of Classification Search
None
See application file for complete search history.

(56) References Cited

U.S. PATENT DOCUMENTS

| | | | |
|---|---|---|---|
| 8,671,222 B2* | 3/2014 | Gass | G06F 8/65 709/246 |
| 10,230,798 B2 | 3/2019 | Doraiswamy et al. | |
| 10,379,842 B2 | 8/2019 | Malladi et al. | |
| 2018/0376416 A1* | 12/2018 | Khanna | H04W 84/18 |
| 2019/0036716 A1* | 1/2019 | Kasaragod | G06N 3/08 |
| 2020/0169381 A1* | 5/2020 | Khanna | G06N 3/08 |
| 2021/0286611 A1* | 9/2021 | Garvey | G06F 8/65 |
| 2023/0118065 A1* | 4/2023 | Kumar | G06F 11/3684 717/124 |

\* cited by examiner

*Primary Examiner* — Qamrun Nahar
(74) *Attorney, Agent, or Firm* — Robert C. Kowert; Kowert, Hood, Munyon, Rankin & Goetzel, P.C.

(57) ABSTRACT

A feature deployment service of a provider network may deploy feature processing units (FPUs) to implement data processing features at both a provider network and edge devices. The use of FPUs may allow a client to use new features at the edge, without delays due to compliance/ testing or software upgrades. An FPU includes a model and compute logic that are used to implement a data processing feature. A feature processing service deploys the FPU to an FPU engine at the provider network and also deploys the FPU to edge devices of the client's network that each include an edge FPU engine. The FPU engine at the provider network and the edge FPU engine at each edge device conform to a common specification/API, allowing deployment and use of the same FPU/data processing features at both the cloud and the edge.

20 Claims, 8 Drawing Sheets

CONTINUOUS DEPLOYMENT AND ORCHESTRATION OF FEATURE PROCESSING UNITS IN A MANAGED CLOUD AND A PROVIDER NETWORK FOR CONSISTENT DATA PROCESSING

BACKGROUND

The Internet of Things (IoT) is a phrase given for the interconnection of computing devices scattered around the globe within the existing internet infrastructure. Clients of a cloud service provider may use IoT devices to collect data (e.g., sensor data), processes the data at the IoT device, and/or send data to the service provider for processing at the cloud. For example, temperature and pressure sensors installed on a machine at an industrial client's manufacturing facility may collect temperature and pressure values. The values may be processed by an edge device and/or may be transmitted to the service provider for processing.

A client may decide to install data analytics software from the service provider to an edge device for distributed processing of sensor data collected from sensors at their edge machines. When the service provider updates various aspects of the data analytics software, there may be a delay before the updated software can be installed and/or used at the client's edge device (e.g., due to the client's software installation/testing/compliance policies). Therefore, there may be a significant delay before the updated software is eventually installed at the client site. In addition, in many cases, the client may not have a desire or need to use various new features included in the updated software. The delay in updating the software at the edge device results in different versions of the data processing analytics software being used at the service provider and the edge device, potentially causing inconsistent results and/or data analysis errors.

Figure 1:
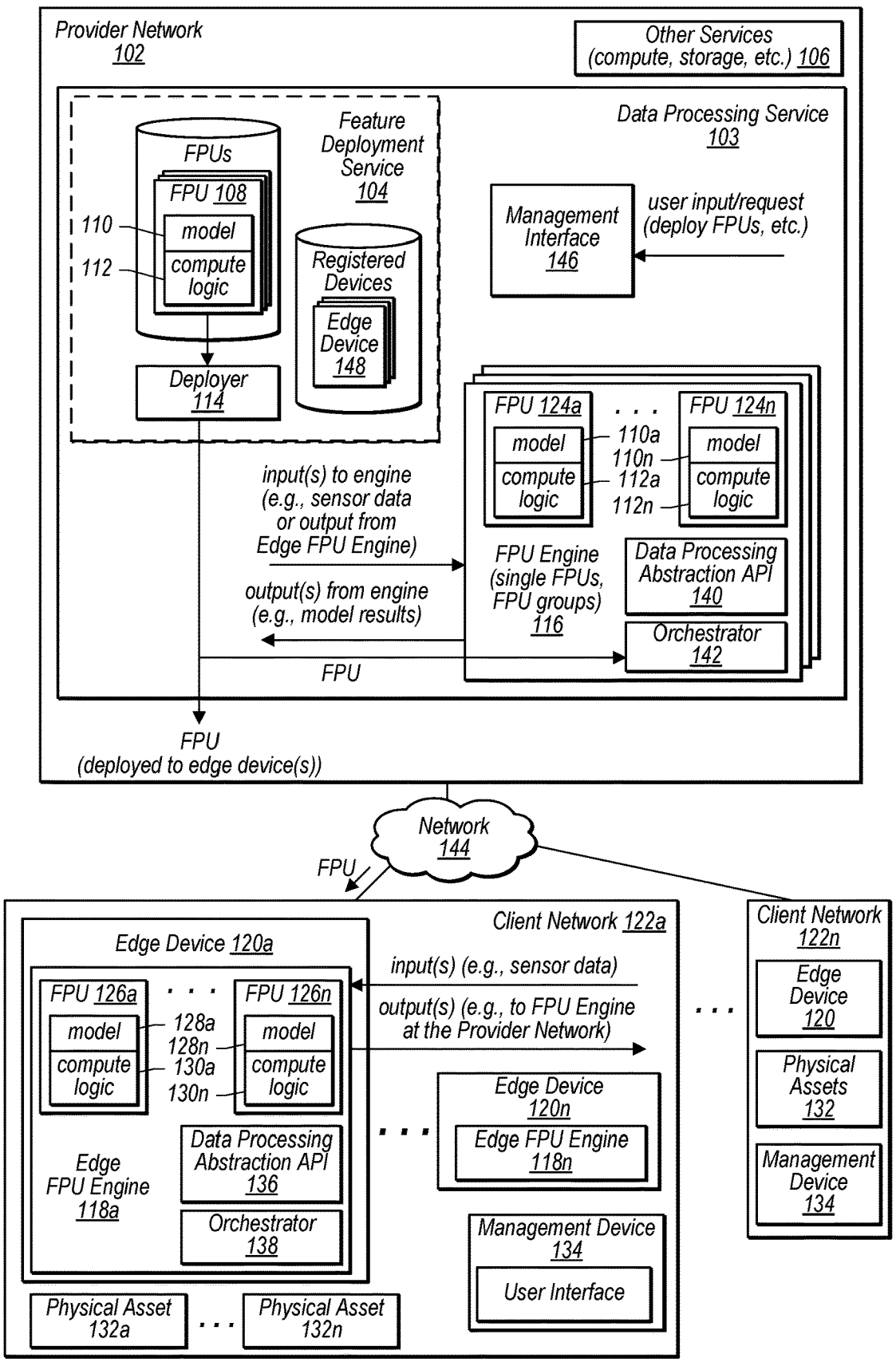
FIG. 1 is a logical block diagram illustrating a system for continuous deployment and orchestration of FPUs in a managed cloud and a provider network for consistent data processing, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments for deploying feature processing units (FPUs) to implement consistent data processing features at a provider network and edge devices (e.g., continuous deployment and orchestration of FPUs in a managed cloud and a provider network for consistent data processing), according to some embodiments. A feature processing unit may include a model and/or compute logic to implement a data processing feature. In embodiments, a feature deployment service may deploy one or more feature processing units to an FPU engine at the provider network and to FPU engines at any number of remote IoT devices of a client (also referred to as edge devices).

In embodiments, an FPU engine may execute a feature-independent portion of the model and/or compute logic using a data processing abstraction application programming interface (API) (also referred to herein as an "abstraction API") of the FPU engine and may also execute a feature-specific portion of the model and/or compute logic using the abstraction API. In some embodiments, the feature-specific portion uses compute logic that is bundled along with the FPU as well as other common logic (e.g., data points extraction from a compressed data set and feeding the data points into feature-dependent compute logic.). The bundled compute logic may use the abstraction API to perform computations (data stream joins, etc.).

In an embodiment, the abstraction API of FPU engines of different edge devices and the abstraction API of the FPU engine of the provider network (e.g., at the feature deployment service) conform to a common API specification. In embodiments, the data processing abstraction API may include different API components (model schema API, topology schema API, and/or data processing API). In some embodiments, an orchestration component(s) may coordinate various aspects of deployment and execution of FPUs at the cloud and the edge devices (e.g., deployment of FPUs and FPU updates, coordinating data flow between FPUs, etc.).

In embodiments, a client may implement various data processing features on an edge device in order to obtain data insights for a system or process (e.g., overall equipment effectiveness (OEE)) of a production process or anomaly detection in the operation of equipment). In various embodiments, the deployment of individual FPUs or groups of FPUs may allow a user/client to add new data processing features or update individual data processing features at edge devices in a more rapid and flexible manner and with fewer errors/inconsistencies, compared to traditional techniques for upgrading edge software.

Using traditional techniques for upgrading edge software, a new data processing feature released by a service provider (e.g., new computational logic/data insight features) may be available for use on the service provider's equipment/servers, but use of that new data processing feature at a client's edge devices may require a major software upgrade at the edge devices. In many cases, the edge devices may require a long qualification cycle for the software upgrade, the software upgrade must meet local regulations, compliances, and/or certifications that may take several months to complete, and the client may lack maintenance windows for the software upgrade. As a result, the data processing features at the edge devices may lag behind the updated data processing features at the service provider. This may lead to inconsistent results between the edge devices and the service provider. Using traditional techniques, a client may need to upgrade all of their edge software (e.g., execution engines, data processing/streaming framework, etc.), even though the client may not need or desire to use many of the new/upgraded data processing features of the upgraded version of the software.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 8 and described below.

This specification begins with a description of a system for deploying feature processing units to implement data processing features at a provider network and edge devices. A number of different methods and techniques for deploying feature processing units to implement data processing features at a provider network and edge devices are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for continuous deployment and orchestration of FPUs in a managed cloud and a provider network for consistent data processing, according to some embodiments.

As shown, a provider network 102 provides a data processing service 103 that includes a feature deployment service 104 that implements deployment of feature processing units to implement data processing features at a provider network and edge devices. In the example embodiment, the provider network 102 also includes any number of provider resources 106, such as compute services and/or storage services. In embodiments, any of the compute and/or storage functionality described for the feature deployment service 104 may be provided, at least in part, by one or more of the other services 106. For example, another IoT service may maintain a database of all the registered edge devices for each client.

In the depicted embodiment, the feature deployment service 104 may store any number of FPUs 108. Each FPU may include a model 110 to implement a data processing feature and/or compute logic 112 (e.g., one or more functions/code) to implement the data processing feature. Any number of the FPUs may be provided/uploaded by the client and/or provided by the provider network or third-party.

As described below, in various embodiments an FPU may also include metadata that describes various aspects of the FPU (e.g., configuration of the FPU, the name/identifier of model(s) and/or function(s) that implement compute logic, security credentials and roles with associated policies, types of input data sources for the model and/or compute logic to process/generate result(s), and/or types of targets to receive/process output data/result(s) generated by the model and/or compute logic). For example, a type of input data source or type of target for output data may be a type of FPU (e.g., an FPU that uses a particular type of model and/or compute logic) or a type of physical asset (e.g., a type of sensor or other physical asset). In embodiments, the metadata may indicate a type of input data to be processed (e.g., data of a particular format, data that describes an environmental condition such as temperature, etc.).

In embodiments, the metadata of any given deployed FPUs may indicate the flow of data between the model and/or compute logic of the FPU and one or more other models and/or or compute logic of other FPUs (e.g., any number of sources of input data for the FPU and/or any number of targets of output data from the FPU). The metadata for a particular deployment of an FPU may indicate an identifier of a specific instance of another FPU or physical asset as an input data source or as a target for output data. In such cases, the orchestrator may perform runtime binding in order to enable data flow based on the instance-specific metadata.

A source of input data may be from a sensor embodied in a physical asset at the client site/network or output data of another FPU implemented by the FPU engine or edge FPU engine. A target of output data may be a controller of a physical asset at the client site/network or another FPU implemented by the FPU engine or edge FPU engine. In embodiments, the feature deployment service 104 may store any number of different FPUs for any number of different clients of the service.

As shown, a deployer 114 may deploy any number of FPUs (e.g., a particular FPU or a group of FPUs) to an engine at the provider network (e.g., FPU engine 116 of the data processing service 103) as well as to edge FPU engines 118 of any number of edge devices 120 of a client network 122. In some embodiments, the data processing service 103 and the feature deployment service 104 may be considered part of the same service or provided as part of the same service. In various embodiments, any components of the data processing service may instead be considered part of the feature deployment service or any components of the feature deployment service may instead be considered part of the data processing service. Therefore, in embodiments, reference to the feature deployment service may be replaced by the data processing service, and vice versa.

In various embodiments, any of the components discussed herein may be implemented across one or more services/components of the provider network and/or edge devices. For example, an orchestrator component 138, 142 may be implemented across any number of services and/or computing devices in order to coordinate deployment and execution of FPUs at the provider network and the edge devices, described in more detail below.

In the depicted example, the FPUs 124*a*-124*n* of the FPU engine 116*a* are also deployed as FPUs 126*a*-126*n* of the edge FPU engine 118*a*. For example, the deployer 114 may deploy the same FPU to the FPU engine 116*a* (shown as FPU 124*a*) and to the edge FPU engine 118*a* (shown as FPU 126a). Therefore, the model 110a may be the same as the model 128a and compute logic 112a may be the same as compute logic 130a.

In the depicted embodiment, a given client network (e.g., client network 122a) may include any number of edge devices 120, any number of physical assets 132, and/or any number of management devices 134. As shown, a given edge device may run/execute an edge FPU engine, which may implement FPUs 126, an abstraction API 136, and an orchestrator 138. The abstraction API 140 and the orchestrator 142 of the FPU engine 116 at the provider network 102 may perform the same (or similar) functionality as the abstraction API 136 and the orchestrator 138. In embodiments, any number of clients of the feature deployment service 104 may use the feature deployment service 104 by communicating with the provider network 102 from a remote network 122 of the corresponding client (e.g., via a wide area network 144, such as the internet).

As shown, the orchestrator 138, 142 may receive FPUs/FPU updates that are deployed to an FPU engine 116 or edge FPU engine 118, deploy the FPUs/FPU updates into the FPU engine 116, 118, and execute/enable execution of the FPUs/updated FPUs. The orchestrator 138, 142 may identify any number of data flows to be coordinated between a newly deployed/updated FPU and any number of other FPUs as well as data flows from other data sources to the newly deployed FPU/updated FPU (e.g., from sensors or other physical assets) and from the newly deployed FPU/updated FPU to other data targets (e.g., to a remote FPU engine at the provider network or an edge device or to a physical asset as a control signal).

During execution of the FPUs, the orchestrator 138, 142 may coordinate the identified data flows between all of the FPUs, data sources, and data targets. The orchestrator 138, 142 may coordinate the new data flows for the newly deployed FPU/updated FPU without interrupting the execution of the other FPUs (e.g., by implementing runtime binding, described below). In some embodiments, the orchestrator may receive an updated FPU (e.g., including an updated version of a model to implement a data processing feature and/or an updated version of compute logic to implement the data processing feature). The orchestrator may replace the previous version of the FPU with the updated FPU at the FPU engine and execute the updated FPU at the FPU engine without interrupting execution of any number of other FPUs at the FPU engine (e.g., by implementing runtime binding).

The Data processing service 103 includes a management interface 146 (e.g., a management API) that may receive user input from a management device 134 of a remote client network (e.g., via a user interface of the management device). For example, a user may provide input via a graphical user interface or command line interface of a display device. In the example embodiment, the management interface 146 receives user input from the management device 134 of the client network 122a of a client (e.g., a request to deploy the FPU 108). In some embodiments, the management interface 146 may receive commands from an application running at the provider network, initiated by an operator of the remote client.

In embodiments, a client may configure the feature deployment service to automatically deploy new FPUs and/or updates to FPUs (deployed to the cloud FPU engine and/or the edge FPU engines) in response to their release at the cloud (e.g., when they become available for deployment). For example, a client may send, via a management interface to the feature deployment service, a request for automatic deployment of new FPUs or updates to FPUs (e.g., client consent for automatic deployment). The request configures the feature deployment service to automatically deploy new FPUs and/or updates to FPUs (to the cloud FPU engine and/or the edge FPU engines) in response to being released/becoming available for deployment at the feature deployment service. Based on the request, one or more edge devices may receive, from the feature deployment service, a new FPU or an update to the FPU that has become available at the feature deployment service and deploy the new FPU or the update to the FPU to the FPU engine of the edge device. The orchestrator may then configure/execute the new FPU or updated FPU (e.g., identify/coordinate data flow between the new/updated FPU and one or more other FPUs executing at the FPU engine).

A given physical asset 132 may be any type of equipment (machine, sensor, etc.) that may provide input data to the edge FPU engine 118 and/or FPU engine 116 (e.g., input to an FPU/model/compute logic) and/or receive output control signals from the edge FPU engine 118 and/or FPU engine 116 (e.g., output from an FPU/model/compute logic). The feature deployment service 104 may also store a record/data for any number of edge devices 148 as registered devices for use with the service (e.g., as edge devices 120 to deploy FPUs to).

In embodiments, the feature deployment service 104 may deploy one or more FPUs to the FPU engine and/or to the edge FPU engines of any number of target edge devices in order to implement one or more new data processing features or to replace one or more FPUs with an updated FPU (to provide an updated data processing feature). Clients may use FPUs at an edge FPU for edge processing for latency sensitive applications that cannot tolerate the longer round trip time to cloud and/or for reducing network bandwidth to the cloud/provider network for cost savings (as well as for protection of raw data at the edge).

In some embodiments, the data processing service (e.g., an FPU or other computation logic) may receive results from any number of different edge devices and generate an output/metric based on an aggregation of the results from different devices. For example, the data processing service may receive, from an edge device of a client, a result generated by implementation of an FPU at the edge device (e.g., processed temperature data and/or pressure data). The data processing service may also receive, from any number of other edge devices of the client, any number of other results generated by implementation of another FPU at the other edge devices. The data processing service may generate an output based at least on aggregation of the result and the other results (e.g., a metric such as an average).

In various embodiments, any type/number of metrics may be computed in the same/similar manner by receiving data from edge device(s) and performing operation(s) on the data. For example, an FPU at the cloud FPU engine may receive data from FPU(s) at edge device(s) and perform operation(s) on the data to compute an overall efficiency metric for one or more physical assets/machines at the client site.

In some embodiments, a new FPU may be deployed to implement a data processing feature that obtains temperature input from two different temperature sensors and averages the inputs to obtain an average temperature. At a later time, an updated FPU may be deployed to replace the FPU. For example, the updated FPU may have a model and/or compute logic that provides more accurate results and/or generates results in less time.

By using FPUs to implement data processing features, a client has the ability to add (or update) one or more particular data processing features to particular edge devices and/or the provider network, without the need to perform a software update for an entire data processing engine across every edge device of the client (different edge devices may be in different stages of use (production/testing/etc.) that may disallow updates). For example, the deployer 114 may deploy a new FPU (that implements a new data processing feature) to the FPU engine 116a (shown as FPU 124a) and to the edge FPU engine 118a (shown as FPU 126a) as part of the same deployment for a new data processing feature. Furthermore, When the new FPU is deployed to the FPU engine 116, a feature-independent portion of the model 110a and/or the compute logic 112a may be executed using an abstraction API of the FPU engine 116 and a feature-specific portion of the model and/or the compute logic may be executed using the abstraction API of the local FPU engine. When the new FPU is deployed to the edge FPU engine 118a of the edge device 120, a feature-independent portion of the model 128a and/or the compute logic 130a may be executed using an abstraction API of the edge FPU engine 118a and a feature-specific portion of the model and/or the compute logic may be executed using the abstraction API of the local FPU engine.

In embodiments, feature-specific portions of the model and/or compute logic may include feature compute logic bundled with the FPU and feature-independent portions of the model and/or compute logic may use generic logic (e.g., common functions available to any/all FPUs/engines). In both cases, the abstraction API is used to implement the logic (e.g., through API calls). An example of feature-independent compute logic may be a particular metric computation/function for a given dataset that is used across all FPU engines (e.g., the same function code is used when called by an FPU, regardless of the specific type of FPU). Another example is a particular quality metric computation/function for a given dataset. In embodiments, a change to feature-dependent compute logic of an FPU would only require a restart on FPU engines of the particular FPU(s) that implement the feature-dependent logic. However, a change to feature-independent compute logic may require a restart on FPU engines of all FPUs (although the FPU engine itself may not need to be restarted/updated).

In embodiments, the model and/or the compute logic may include feature independent logic/code that is part of the FPU engine (e.g., implemented by making API calls to the abstraction API of the FPU engine) and feature-specific logic that is part of the FPU bundle (e.g., lightweight feature-specific compute logic/code implemented as java functions or other language functions). In an embodiment, the abstraction API may provide a set of data processing primitives (e.g., filter, transform, interpolate, group, map, aggregate) and a set of data stream management primitives (e.g., join, branch, align). In embodiments, this architecture may enable a client to develop new data processing features using the abstractions provided by an FPU engine. The client may then immediately deploy these new data processing features to edge devices and/or the provider network, avoiding the issues discussed above that are associated with traditional techniques (e.g., delayed feature release to due to software qualification cycles, meeting local regulations, compliance, and/or certifications).

Figure 2:
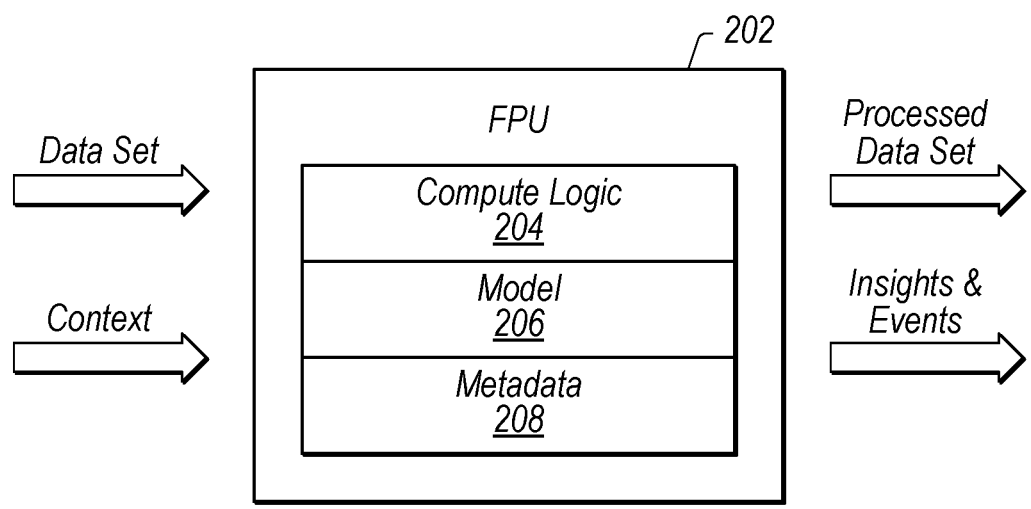
FIG. 2 illustrates the operation of a feature processing unit, according to some embodiments.

FIG. 2 illustrates the operation of a feature processing unit, according to some embodiments.

In the depicted example, the feature processing unit 202 includes compute logic 204 (e.g., "feature processing logic"), a model 206 (e.g., "feature model"), and metadata 208. In embodiments, the metadata includes data that describes/indicates various aspects of the FPU (e.g., configuration, inputs/outputs for the model and/or compute logic, model name, security constructs such as encryption/authentication keys, roles, and/or associated authorization policies).

In embodiments, the compute logic 204 and/or the model 206 receive a data set from one or more sources (e.g., different temperature sensor readings taken over a period of time, or output of one or more FPUs) and/or context (e.g., data describing a state of equipment and/or environment), process the data set and/or context, and output the processed data set and/or insights/events. For example, a model may process different temperature readings of a data set and output a prediction that a machine will fail due to overheating withing 10 minutes. The compute logic may perform various operations on data (e.g., formatting, averaging) before sending the data to the model for processing. The compute logic may perform any other operations to implement a data processing feature, such as combining, aggregating, or averaging data input from multiple sources (e.g., different sensors, different FPUs) before sending the results to a model for processing.

Figure 3:
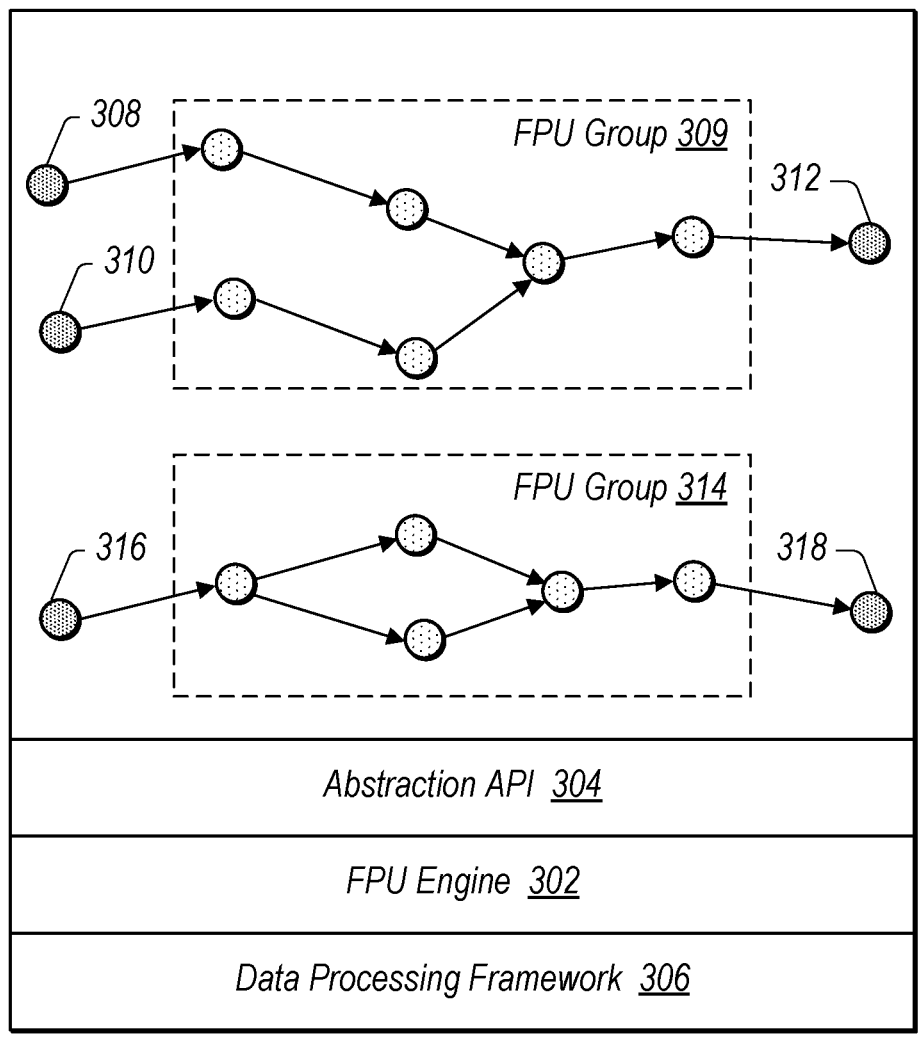
FIG. 3 is an illustration of feature processing units that have been deployed to an FPU engine, according to some embodiments.

FIG. 3 is an illustration of feature processing units that have been deployed to an FPU engine, according to some embodiments.

In the depicted embodiment, the edge FPU engine 302 provides an abstraction API 304 that may implement a model and/or compute logic of each FPU that has been deployed to the FPU engine 302. In the example, 11 FPUs are shown as deployed to the FPU engine 302. As shown, the edge FPU engine may be implemented by a data/stream processing framework 306 (e.g., a stream processing engine/framework such as Apache Flink). In embodiments, the FPU engine 302 and the data/stream processing framework 306 that implements the FPU engine 302 may be considered a "stream processing engine." The abstraction API (e.g., API calls) may be provided by the stream processing engine and the abstraction API may map to the stream processing engine. Although an edge FPU engine is depicted in the example, any of the discussed functionality/aspects may also apply to an FPU engine running at a provider network (e.g., FPU engine 116).

As shown, data from source 308 (e.g., a physical asset, such as a temperature sensor) is processed by two FPUs of an FPU group 309 and other data from source 310 (e.g., another temperature sensor) is processed by two other FPUs of the FPU group 309 before the data and other data is combined at another FPU of the FPU group 309 (e.g., performing sensor fusion). The combined data is sent to another FPU of the FPU group 309 for further processing before the data is sent to a target 312 (e.g., the cloud FPU engine at the feature deployment service or another physical asset as a control signal).

In embodiments, each FPU may include metadata that indicates a source(s) of input data for the FPU (e.g., a physical asset or a model/compute logic of another FPU) and a target(s) of output data of the FPU (e.g., a physical asset, a model/compute logic of another FPU, or the feature deployment service). Therefore, the metadata of each FPU may be used to configure and control the flow of data between different FPUs of a group. In embodiments, a common model may be used by some or all of the FPUs of an FPU group in order to processes data. Therefore, the model may only need to be downloaded from the service once, and then shared and/or duplicated for each FPU that needs to use it.

In the depicted example, five FPUs of an FPU group 314 have been deployed to the FPU engine 302 as a group. As shown, an initial FPU receives data from a source 316 (e.g., a pressure sensor), processes the data, and sends different portions of data to different FPUs for further processing. Another FPU combines the different portions of processed data and sends the combined data to another FPU, which processes the data and sends it to a target 318.

In some embodiments, a given FPU (the model and/or compute logic) may perform any number of functions to process data collected and/or generated from one or more data sources (e.g., sensors and/or other data sources of an industrial environment, such as a manufacturing facility). For example, an FPU may perform one or more filtering operations, aggregation operations, and/or other calculations/operations on the data to process the data before it is sent to a target FPU and/or other destination. In embodiments, any number of FPUs may be chained and/or combined together to realize more complex data processing flows.

In embodiments, a user may configure the topology of FPUs using the feature deployment service and deploy the FPUs (e.g., via the management interface). For example, a chain of FPUs may be graphically represented (e.g., via the user interface of the management device 134) using images that represent different FPUs and arrows that represent the flow of data (similar to the depicted example). In embodiments, any suitable representation may be used to define a workload (e.g., a language or graph). After the user indicates the desired topology of the FPU group (e.g., FPU locations, inputs/outputs for each FPU), then the user may request deployment of the FPU group (e.g., deployment to the FPU engine 116 and to one or more target edge devices 120).

Figure 4:
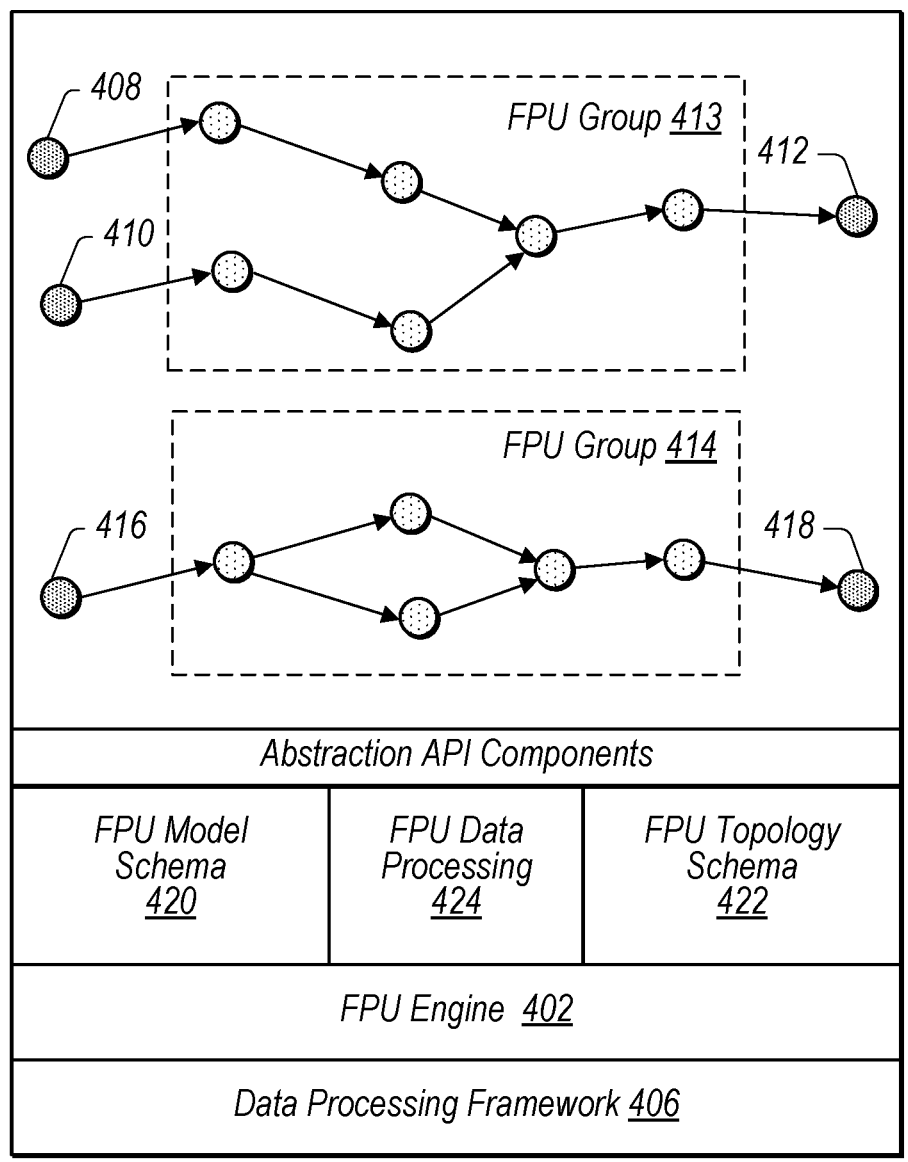
FIG. 4 is an illustration of feature processing units that have been deployed to an FPU engine, according to some embodiments.

FIG. 4 is an illustration of feature processing units that have been deployed to an FPU engine, according to some embodiments.

As in FIG. 3, 11 FPUs are shown as deployed to an FPU engine 402 of an edge device. The edge FPU engine may be implemented by a data processing framework 406 (e.g., a stream processing framework such as Apache Flink). As in FIG. 3, the FPU engine 302 and the data/stream processing framework 306 that implements the FPU engine 302 may be considered a "stream processing engine." The abstraction API (e.g., API calls) may be provided by the stream processing engine and the abstraction API may map to the stream processing engine. Although an edge FPU engine is depicted in the example, any of the discussed functionality/aspects may also apply to an FPU engine running at a provider network (e.g., FPU engine 116). In the depicted example, the data processing abstraction API includes a model schema API to define data processing models, a topology schema API to define inputs and outputs for different FPUs, and/or a data processing API to perform data processing functions, described in more detail below.

The FPUs in the depicted example and the sources and targets are in the same or similar configuration as in FIG. 4. Therefore, the sources 408 and 410 and the target 412 may be used with FPUs (e.g., FPU group 413) in the same way as described for the sources 308 and 310 and the target 312 of FIG. 3. Similarly, the FPU group 414 may be used with the source 416 and target 418 in the same was as described for the FPU group 314 used with the source 316 and target 318 of FIG. 3.

In the example embodiment, the Abstraction API is made of three API components: 1) an FPU model schema 420 abstraction API, 2) an FPU data processing 424 abstraction API, and 3) an FPU topology schema 422 abstraction API.

Using the FPU model schema 420, a client (e.g., customer of the service provider network) can design their own model for data processing (e.g., using complex parent child relationships that do not exist using traditional techniques and that may be applicable to their use cases). Using the FPU data processing 424, a customer can write FPU compute logic that can use the underlying engine 402 compute functions (e.g., metric computations over a sliding window).

The FPU topology schema 422 may provide a customer the topology API for splitting and joining different inputs/outputs of FPUs to achieve a processing topology that fits the customer's use case. In the illustrated example, a client has specified a graph topology for each FPU group 413, 414 that shows inputs and outputs for each FPU (e.g., each node of the graph).

Clients can develop FPUs using any combination of the APIs 1, 2, and/or 3 discussed above (e.g., via API calls to the APIs from models and/or compute logic) to achieve a true and/or more accurate representation of their data processing system and associated insights computation not available using traditional techniques. Using traditional techniques, a client would require much more time develop a complex data processing system (e.g., using many man-years to achieve a specific use case). Using FPUs and the abstraction APIs, customers may achieve their desired data processing with much less effort/time, allowing them to focus on their problem domain rather than on heavy/complex infrastructure.

In embodiments, the FPU model schema 420 defines schema elements through a schema definition language that enables the FPU Engine 402 to perform data processing in a model-independent manner. Therefore, the FPU model schema definition language may provide the abstraction that separates the model definition from the processing engine (e.g., FPU engine).

In some embodiments, a user of a client (e.g., client company or other organization) may understand the schema elements (e.g., transforms) but may not be aware of the FPU model schema language. The introduction of a new model schema element would affect the FPU engine and may occur much less frequently compared to the introduction of new data processing features (via deployment of new FPUs). In such embodiments, an FPU may be a bundle that includes the data processing features expressed using the FPU model schema, the compute logic for the feature, and/or metadata.

In various embodiments, the FPU topology schema 422 may define the data sources for FPU inputs and the data targets for FPU outputs (e.g., based on extracting metadata from the FPUs that describes inputs/outputs). In embodiments, the FPU topology schema 422 may define the wiring of FPUs with different input data flows within the "source" data streams, the wiring between other FPUs, the tagging of the output data flows, and/or the wiring of the output data flows to the "sink" data streams.

In embodiments, the separation of the FPU feature from the engine may require a topology description that enables the engine to load and operate the data processing function in an FPU model instance context. In various embodiments, an FPU model instance may be an instantiation of an FPU model, whereas an FPU model may be defined using a modeling language to describe a system or a process, to describe the streaming data generated by the system or process, and to define the data filters, extraction, transformations, and logic to compute data insights, predictions, or other results.

Using traditional techniques, models and/or code/compute logic are implemented using compile time binding.

However, in various embodiments, the abstraction API (including any of the API components) may enable runtime binding of FPUs and/or any changes to FPU models and compute logic, which provides another advantage over traditional data processing techniques. For example, to implement a new model and/or code/compute logic at and edge device using traditional techniques, the entire software stack (e.g., framework 406, engine 402, etc.) needs to be changed/replaced and compiled. However, using embodiments herein, a new FPU or a change to an existing FPU (e.g., adding new API calls) can be downloaded and implemented at the edge device without changing or interrupting execution of existing FPUs, the engine 402, framework 406, etc.). In other words, new FPU/features or changes to FPUs/features can be added through runtime binding, avoiding the delays and additional computing resources associated with traditional techniques (e.g., compile time binding).

Figure 5:
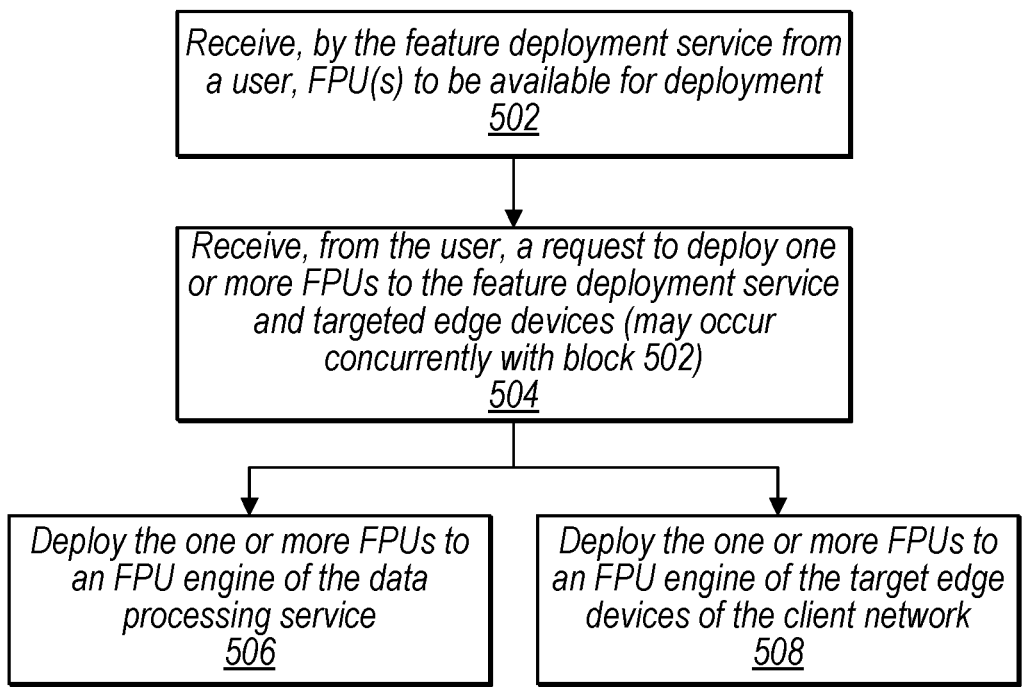
FIG. 5 is a high-level flowchart illustrating various methods and techniques to deploy feature processing units to FPU engines at a provider network and at edge devices, according to some embodiments.

FIG. 5 is a high-level flowchart illustrating various methods and techniques to deploy feature processing units to FPU engines at a provider network and at edge devices, according to some embodiments. In various embodiments, any of the functionality described for any portions of the flowcharts 5-7 may be performed by any of the components of FIGS. 1-4 and/or 8.

Figure 6:
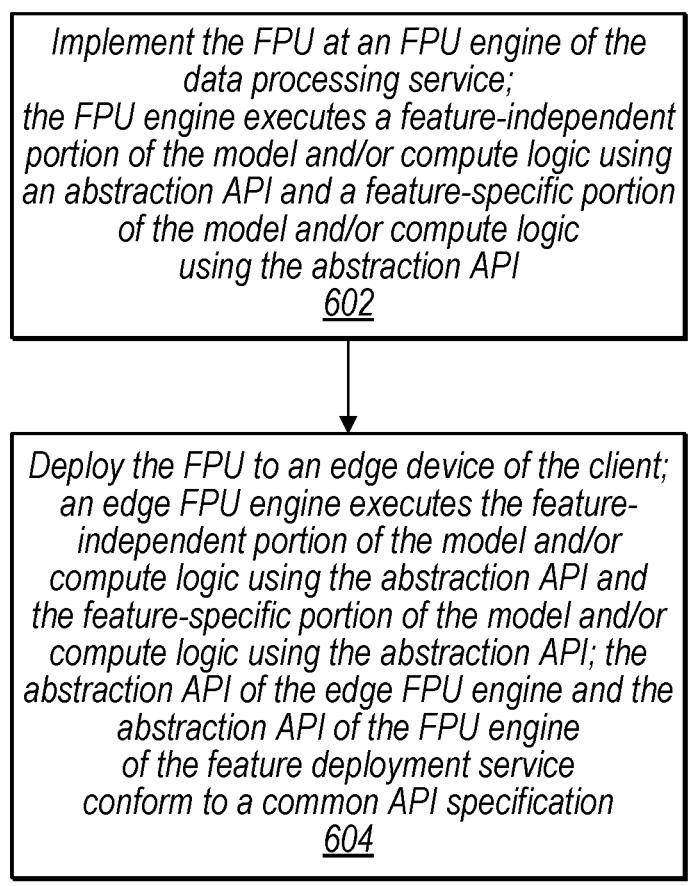
FIG. 6 is a high-level flowchart illustrating various methods and techniques to implement feature processing units at a provider network and edge devices, according to some embodiments.
Figure 7:
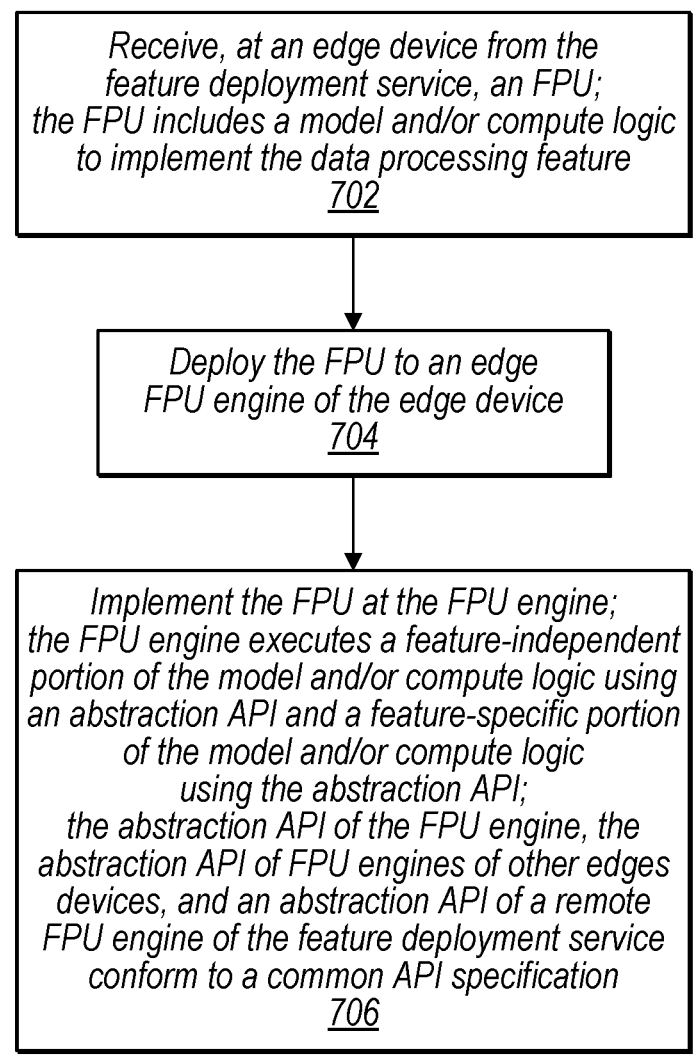
FIG. 7 is a high-level flowchart illustrating various methods and techniques to deploy and implement a feature processing unit at an edge device, according to some embodiments.

These techniques, as well as the techniques discussed with regard to FIGS. 6 and 7, may be implemented using components or systems as described above with regard to FIGS. 1-4, as well as other types of components or systems, and thus the following discussion is not intended to be limiting as to the other types of systems that may implement the described techniques. For example, any of the techniques may be implemented by a feature deployment service of a provider network and/or by a local service/application of a client network.

At block 502, a feature deployment service receives, from a user (e.g., via the management device 134/management interface 146), one or more FPUs that are to be available for deployment to edge devices of a client's network and/or the provider network/feature deployment service. For example, the user may send, to the feature deployment service, the model to implement a data processing feature, the compute logic to implement the data processing feature, and/or metadata that describes one or more aspects of the FPU. In embodiments, metadata may include an indication of one or more sources of input data for the FPU/model/compute logic and/or an indication of one or more targets for output data of the FPU/model/compute logic. In embodiments, any number of FPUs may be provided by the feature deployment service as pre-made FPUs (e.g., developed by the provider network or a third-party entity).

At block 504, the feature deployment service receives, from the user, a request to deploy one or more FPUs to the feature deployment service and/or to one or more target edge devices of the client's network. In some embodiments, the user may select one or more FPUs from among a group of FPUs that are available for deployment (e.g., via user input using a graphical user interface that displays the group of FPUs). In embodiments, the user may also select one or more edge devices of the client's network as target edge devices that the selected FPUs are to be deployed to. In some embodiments, the user may select one or more groups of edge devices, where each group may include any number of target edge devices that the selected FPUs are to be deployed to. In some embodiments, blocks 502 and 504 may occur in parallel or concurrently. For example, one user of a client may upload an FPU to a library of FPUs, while another user of the client may request the FPU or a different FPU to be deployed to edge devices.

At block 506, the feature deployment service deploys the selected FPUs to an FPU engine of the feature deployment service. In some embodiments, the FPU engine may be hosted by another service of the provider network. At block 508, the feature deployment service also deploys the selected FPUs to the selected target edge devices or selected groups of target edge devices (e.g., to an edge FPU engine of the selected device(s) or selected group(s) of devices).

In embodiments, the deployment of the FPUs to the FPU engine of the provider network and the edge FPU engine of the edge devices may occur concurrently and/or at approximately the same time. In embodiments, this allows for new data processing features to be available at both the cloud and the edge devices (e.g., without a substantial lag in availability at the edge devices, as with traditional techniques).

At any point in time, the feature deployment service may deploy a new FPU or another group of FPUs to the FPU engine and/or to any number of target edge devices (e.g., to any number of edge FPU engines of respective target edge devices). In embodiments, the new FPU may be used with previously deployed FPU(s) and/or any number of physical assets of the client.

In embodiments, output data (e.g., model result(s) and/or compute logic result(s)) from one or more previously deployed FPUs and/or physical assets may be provided as input data for processing by the new FPU (e.g., by a model(s) and/or compute logic) and/or output data from the new FPU (e.g., model result(s) and/or compute logic result(s)) may be provided as input data for processing by one or more previously deployed FPUs (e.g., to a model(s) and/or compute logic) and/or to controllers of physical assets. In some embodiments, output data (e.g., model result(s) and/or compute logic result(s)) from any number of the FPUs may be provided to the provider network for further processing (e.g., to the feature deployment service).

In various embodiments, the edge device (e.g., the edge FPU engine) may receive an updated FPU that replaces a previously deployed FPU (e.g., previous version of the FPU with a previous version of a model and/or compute logic). The updated FPU may include an updated version of the model to implement a data processing feature and/or an updated version of the compute logic to implement a data processing feature.

The edge FPU engine may replace the model with the updated version of the model and/or replace the compute logic with the updated version of the compute logic. This may allow a client/customer of the feature deployment service to update individual data processing features or use new data processing features at any point in time, without the need to wait for an updated FPU engine and/or other updated software to be developed/released by the provider network.

In embodiments, a new FPU or updated version of an FPU (e.g., updated model and/or compute logic) may be developed by the client/customer, uploaded to the feature deployment service (e.g., as part of the new or updated FPU), and then selected by the user or another user of the client (or a user of another clients) for deployment as described herein. In some embodiments, the new or updated FPU is automatically deployed (e.g., to one or more edge devices) in response to the feature deployment service determining that the new or updated FPU is available for deployment (e.g., in response to receiving the updated FPU from the client or other source). This may allow new FPUs to be quickly deployed or allow FPUs to be quickly updated, resulting in a much more granular control and flexibility for a client compared to traditional techniques.

FIG. 6 is a high-level flowchart illustrating various methods and techniques to implement feature processing units at a provider network and edge devices, according to some embodiments.

At block 602, the feature deployment service implements an FPU at an FPU engine of a feature deployment service (e.g., after the FPU is deployed to the FPU engine). In embodiments, the FPU engine executes a feature-independent portion of the model and/or compute logic using an abstraction API and a feature-specific portion of the model and/or compute logic using the abstraction API.

At block 604, the feature deployment service deploys the FPU to an edge device of the client. The edge FPU engine executes the feature-independent portion of the model and/or compute logic using the abstraction API and the feature-specific portion of the model and/or compute logic using the abstraction API (e.g., after the edge device deploys the FPU to the edge FPU engine). In embodiments, the abstraction API of the edge FPU engine and the abstraction API of the FPU engine of the feature deployment service conform to a common API specification (or common FPU engine specification).

In some embodiments, the abstraction API of any number of other edge FPU engines of other edge devices of the client network may also conform to the common API specification (or the common FPU engine specification).

In some embodiments, at least some of the feature-independent portion of the model and/or compute logic may bypass the abstraction API and directly use the FPU engine 402 and/or the framework 406, since the feature-independent portion of the model and/or compute logic may be common/standard functions/code (e.g., generic code) that are used across every engine. This is one way that performance/processing speed may be increased even further.

FIG. 7 is a high-level flowchart illustrating various methods and techniques to deploy and implement a feature processing unit at an edge device, according to some embodiments.

At block 702, the edge device receives, from the feature deployment service, an FPU. The FPU may include a model and/or compute logic to implement a data processing feature (in embodiments, the FPU may also include metadata). At block 704, the edge device deploys the FPU to an edge FPU engine of the edge device.

At block 706, the FPU implements the FPU. In embodiments, the implementation of the FPU may include the FPU engine executing a feature-independent portion of the model and/or compute logic using an abstraction API and executing a feature-specific portion of the model and/or compute logic using the abstraction API. In embodiments, the abstraction API of the FPU engine, the abstraction API of FPU engines of other edges devices of the client, and an abstraction API of a remote FPU engine of the feature deployment service conform to a common API specification.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors.

The program instructions may implement the functionality described herein (e.g., the functionality of the feature deployment service, other services, edge devices, models, compute logic, and any other components/devices that implement the techniques described herein). The various methods as illustrated in the figures and described herein represent example embodiments of methods. The order of any method may be changed, and various elements may be added, reordered, combined, omitted, modified, etc.

Figure 8:
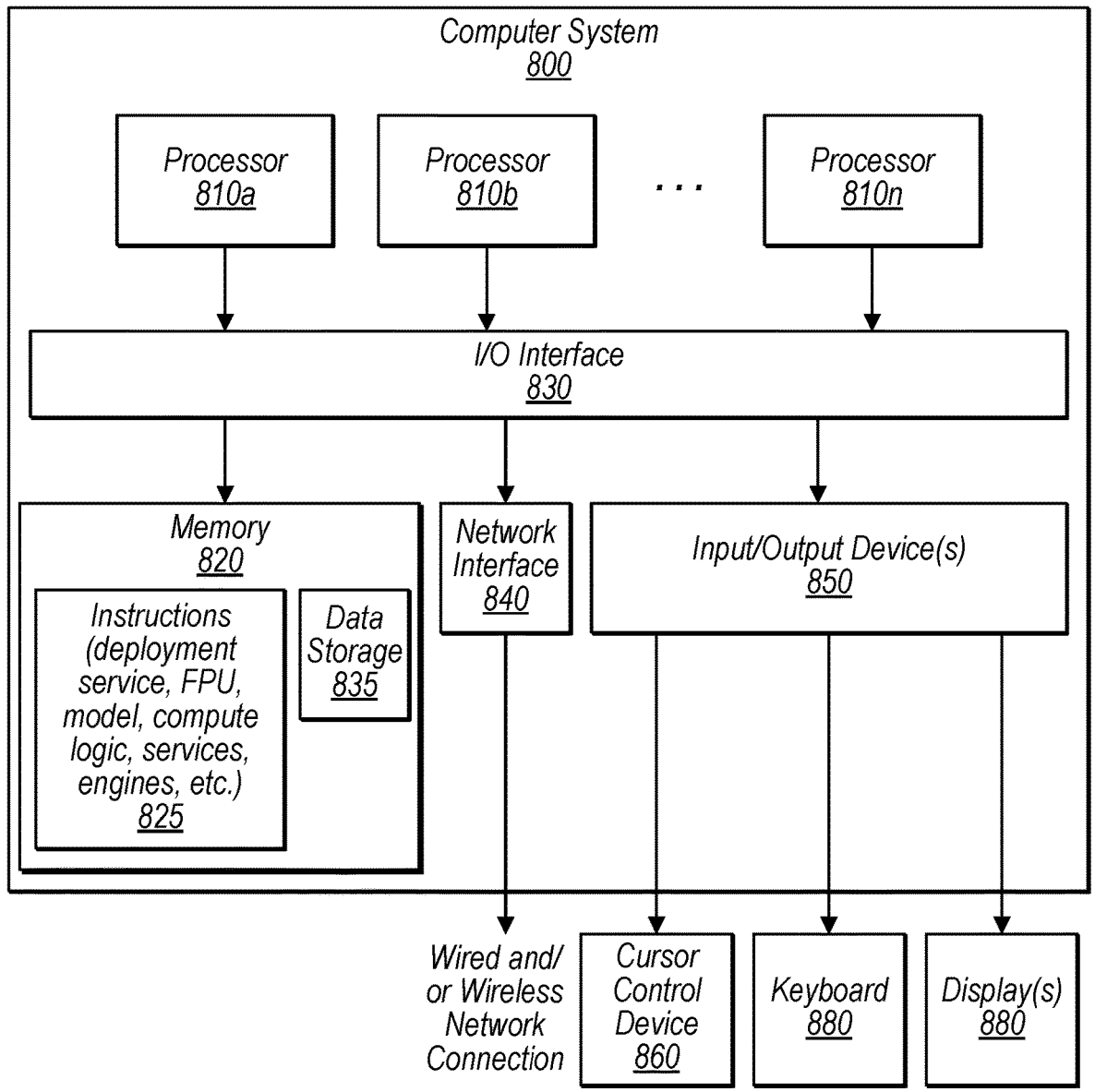
FIG. 8 is a block diagram illustrating an example computing system, according to some embodiments.

Embodiments to implement deploying feature processing units to implement data processing features at a provider network and edge devices as described herein may be executed on one or more computer systems, which may interact with various other systems or devices. One such computer system is illustrated by FIG. 8. In different embodiments, computer system 800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. Display(s) may include standard computer monitor(s) and/or other display systems, technologies or devices, in one embodiment. In some embodiments, it is contemplated that embodiments may be implemented using a single instance of computer system 800, while in other embodiments multiple such systems, or multiple nodes making up computer system 800, may host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions, in one embodiment. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

In some embodiments, at least one processor 810 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 820 may store program instructions 825 and/or data accessible by processor 810, in one embodiment. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the feature deployment service, other services, edge devices, models, compute logic, and any other components/devices, etc.) are shown stored within system memory 820 as program instructions 825 and data storage 835, respectively. In other embodiments, program instructions and/or data may be received, sent or stored upon different types of computer-accessible media or on similar media separate from system memory 820 or computer system 800.

A computer-accessible medium may include non-transitory storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840, in one embodiment.

In one embodiment, I/O interface 830 may be coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810).

In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. In addition, in some embodiments some or all of the functionality of I/O interface 830, such as an interface to system memory 820, may be incorporated directly into processor 810.

Network interface 840 may allow data to be exchanged between computer system 800 and other devices attached to a network, such as other computer systems, or between nodes of computer system 800, in one embodiment. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or retrieving data by one or more computer system 800, in one embodiment. Multiple input/output devices 850 may be present in computer system 800 or may be distributed on various nodes of computer system 800, in one embodiment. In some embodiments, similar input/output devices may be separate from computer system 800 and may interact with one or more nodes of computer system 800 through a wired or wireless connection, such as over network interface 840.

As shown in FIG. 8, memory 820 may include program instructions 825 that implement the various embodiments of the systems as described herein, and data store 835, comprising various data accessible by program instructions 825, in one embodiment. In one embodiment, program instructions 825 may include software elements of embodiments as described herein and as illustrated in the Figures. Data storage 835 may include data that may be used in embodiments (e.g., models, functions, compute logic, metadata, etc.). In other embodiments, other or different software elements and data may be included.

Those skilled in the art will appreciate that computer system 800 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device.

Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above.

In some embodiments, instructions stored on a computer-readable medium separate from computer system 800 may be transmitted to computer system 800 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium.

Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more processors and one or more memories, wherein the one or more memories have stored thereon instructions, which when executed by the one or more processors, cause the one or more processors to implement a feature deployment service for a plurality of clients of a provider network, wherein the feature deployment service is configured to, for a given client:
   deploy a feature processing unit (FPU) to a local FPU engine of the feature deployment service, wherein the FPU comprises:
      a model to implement a data processing feature; and
      compute logic to implement the data processing feature;
   implement the FPU by the local FPU engine, wherein the implementation of the FPU comprises execution of a feature-independent portion of the model and the compute logic using a data processing abstraction application programming interface (API) of the local FPU engine and execution of a feature-specific portion of the model and the compute logic using the data processing abstraction API of the local FPU engine, and wherein the data processing abstraction API comprises one or more of a model schema API to define data processing models, a topology schema API to define inputs and outputs for different FPUs, or a data processing API to perform data processing functions; and
   deploy the FPU to a plurality of remote edge devices of the client, wherein for a given edge device of the plurality of remote edge devices, the feature-independent portion of the model and the compute logic of the FPU are configured to be executed by the edge device using a data processing abstraction API of an edge FPU engine of the edge device and the feature-specific portion of the model and the compute logic of the FPU are configured to be executed by the edge device using the data processing abstraction API of the edge FPU engine in order to implement the FPU at the edge device,
   wherein the data processing abstraction API of the edge FPU engine and the data processing abstraction API of the local FPU engine of the feature deployment service conform to a common API specification.

2. The system as recited in claim 1, wherein the feature deployment service is further configured to, for the given client:
   receive, from the client via a service interface, a request to deploy the FPU; and
   in response to the reception of the request:
      deploy the FPU to the local FPU engine of the feature deployment service; and
      deploy the FPU to the plurality of remote edge devices of the client.

3. The system as recited in claim 1, wherein the FPU further comprises metadata that indicates one or more of:
   at least one type of input data source for the FPU; and
   at least one type of target for output data of the FPU, wherein the at least one type of input data source is another FPU or the at least one type of target is a dependent FPU that depends on the FPU for the output data.

4. The system as recited in claim 1, wherein the feature deployment service is further configured to:
   deploy another FPU to the local FPU engine, wherein the other FPU comprises:
      another model to implement another data processing feature; and
      other compute logic to implement the other data processing feature;
   implement the other FPU by the local FPU engine, wherein output data from the FPU is provided as input data for processing by the other FPU; and
   deploy the other FPU to the edge device, wherein the other FPU is configured to be implemented by the edge FPU engine, wherein output data from the FPU at the edge FPU engine is provided as input data for processing by the other FPU at the edge FPU engine.

5. The system as recited in claim 1, wherein the feature deployment service is further configured to:
   receive, from the edge device, a result generated by implementation of the FPU at the edge device;
   receive, from one or more other edge devices of the client, one or more other results generated by implementation of the FPU at the one or more other edge devices; and
   generate an output based at least on aggregation of the result and the one or more other results.

6. A method, comprising:
   performing, by an edge device of a network of a client:
      receiving, from a feature deployment service of a remote provider network, a feature processing unit (FPU), wherein the FPU comprises:
         a model to implement a data processing feature; and
         compute logic to implement the data processing feature;
      deploying the FPU to an FPU engine of the edge device; and
      implementing the FPU by the FPU engine, wherein the implementing the FPU comprises executing a feature-independent portion of the compute logic using a data processing abstraction application programming interface (API) of the FPU engine and executing a feature-specific portion of the compute logic using the data processing abstraction API,
      wherein the data processing abstraction API of the FPU engine and a data processing abstraction API of a remote FPU engine of the feature deployment service of the remote provider network conform to a common API specification, and wherein an orchestrator of the FPU engine coordinates data flow between the FPU and one or more other FPUs executing at the FPU engine.

7. The method as recited in claim 6, wherein the implementing the FPU further comprises:
executing a feature-independent portion of the model using the data processing abstraction API and executing a feature-specific portion of the model using the data processing abstraction API.

8. The method as recited in claim 6, wherein the implementing the FPU comprises:
receiving, by the model, the input data from the source, wherein the source of input data comprises a physical asset or another FPU implemented by the FPU engine; and
processing, by the model, the input data to generate a result.

9. The method as recited in claim 8, further comprising:
sending, from the client to the feature deployment service, a request for automatic deployment of new FPUs or updates to FPUs; and
based on the request for automatic deployment of new FPUs or updates to FPUs, performing, by the edge device:
receiving, from the feature deployment service, a new FPU or an update to the FPU that has become available at the feature deployment service; and
deploying the new FPU or the update to the FPU to the FPU engine of the edge device.

10. The method as recited in claim 6, wherein the FPU further comprises metadata that indicates a target for output data for the FPU, and wherein the implementing the FPU comprises:
receiving, by the model, input data from a source;
processing, by the model, the input data to generate a result; and
sending the result to the target, wherein the target for the output data comprises a physical asset or another FPU implemented by the FPU engine.

11. The method as recited in claim 10, wherein the data processing abstraction API comprises one or more of a model schema API to define data processing models, a topology schema API to define inputs and outputs for different FPUs, or a data processing API to perform data processing functions.

12. The method as recited in claim 6, further comprising:
receiving, from the feature deployment service of the remote provider network, a plurality of other FPUs that respectively comprise another model and other compute logic to implement another data processing feature;
deploying the other FPUs to the FPU engine of the edge device; and
implementing the other FPUs by the FPU engine, wherein a result generated by the model is sent to one or more of the other models during the implementing the FPU by the FPU engine.

13. The method as recited in claim 12, wherein one or more of the other FPUs comprise metadata that indicates a flow of data between the model and the one or more other models.

14. The method as recited in claim 6, wherein the data processing abstraction API of the FPU engine and data processing abstraction APIs of FPU engines of other edge devices of the remote client network conform to the common API specification.

15. One or more non-transitory computer-accessible storage media storing program instructions that when executed on or across one or more processors of an edge device of a network of a client cause the one or more processors to:
receive, from a feature deployment service of a remote provider network, a feature processing unit (FPU), wherein the FPU comprises:
a model to implement a data processing feature; and
compute logic to implement the data processing feature; and
implement the FPU by an FPU engine, wherein the implementation of the FPU comprises execution of a feature-independent portion of the compute logic using a data processing abstraction application programming interface (API) of the FPU engine and execution of a feature-specific portion of the compute logic using the data processing abstraction API,
wherein the data processing abstraction API of the FPU engine and a data processing abstraction API of a remote FPU engine of the feature deployment service of the remote provider network conform to a common API specification.

16. The one or more storage media as recited in claim 15, wherein the implementation of the FPU further comprises execution of a feature-independent portion of the model using the data processing abstraction API and execution of a feature-specific portion of the model using the data processing abstraction API.

17. The one or more storage media as recited in claim 15, wherein the program instructions when executed on or across the one or more processors further cause the one or more processors to:
receive, by the model, the input data from the source, wherein the source of input data comprises a physical asset or another FPU implemented by the FPU engine; and
process, by the model, the input data to generate a result.

18. The one or more storage media as recited in claim 15, wherein the FPU further comprises an orchestrator, and wherein to implement the FPU by the FPU engine, the program instructions when executed on or across the one or more processors further cause the one or more processors to:
identify, by the orchestrator, one or more data flows to be coordinated between the FPU and one or more other FPUs executing on the FPU engine; and
coordinate, by the orchestrator, the one or more data flows between the FPU and the one or more other FPUs executing at the FPU engine without interrupting the execution of the other FPUs.

19. The one or more storage media as recited in claim 15, wherein the FPU further comprises an orchestrator, and wherein the program instructions when executed on or across the one or more processors further cause the one or more processors to:
receive, by the orchestrator from the feature deployment service of the remote provider network, an updated FPU, wherein the updated FPU comprises one or more of:
an updated version of the model to implement the data processing feature, or
an updated version of the compute logic to implement the data processing feature; and
replace, by the orchestrator, the FPU with the updated FPU at the FPU engine and execute, by the orchestrator, the updated FPU at the FPU engine without interrupting execution of one or more other FPUs at the FPU engine.

20. The one or more storage media as recited in claim 15, wherein the data processing abstraction API of the FPU engine and data processing abstraction APIs of FPU engines of other edge devices of the remote client network conform to the common API specification.

\* \* \* \* \*